3,232,129
TENSIONERS FOR CHAINS, BELTS AND THE LIKE
John Edward Hopkins, Cheadle, England, assignor to Renold Chains Limited, Manchester, England, a British company
Filed June 22, 1964, Ser. No. 376,921
Claims priority, application Great Britain, June 28, 1963, 25,888/63
6 Claims. (Cl. 74—242.11)

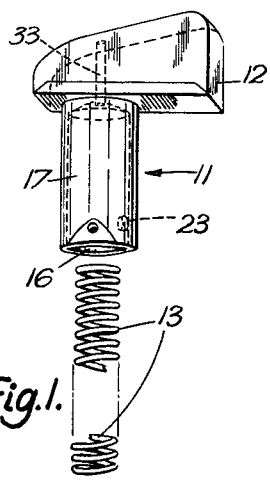
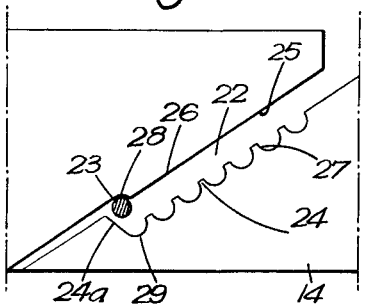
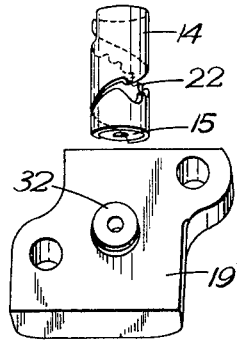
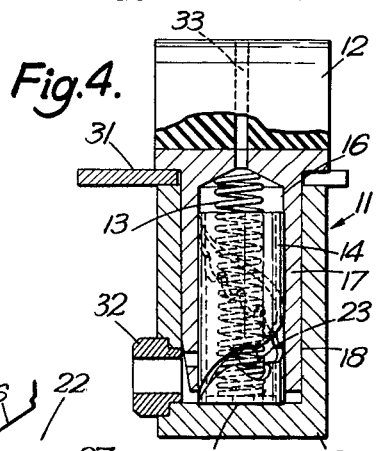
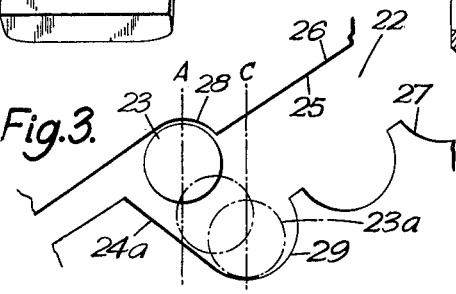

The invention relates to tensioners for chains, belts and the like.

The invention provides a tensioner for chains, belts and the like, comprising two co-axial members relatively movable axially and rotatably about their axis, a helical slot or channel on one member and a projecting part on the other member engaging in the helical slot, biassing means acting between the members to bias together the projecting part and a smooth wall of the helical slot so that the members tend to undergo relative rotational and axial movement and the said part tends to move along the smooth wall from one end thereof towards the other, a recess in the said one end of the smooth wall such that the projecting part can be engaged in the recess to prevent the aforesaid movement under the action of the bias and can be disengaged from the recess by relative axial movement of the members against the action of the bias, and an inclined face at a position opposite to the recess, which inclined face is so shaped and positioned that the members may be moved relatively axially to disengage the said part from the recess and to move the said part into sliding abutment with the inclined face to cause relative rotation of the members to an extent sufficient to ensure that the part does not re-engage in the recess when the members are released for relative movement under the action of the bias.

Preferably the other wall opposite the smooth wall of the helical slot or channel resists, more than the said smooth wall, sliding movement along it of the said projecting part. Preferably the said other wall is serrated.

A specific construction of tensioner embodying the invention will now be described by way of example and with reference to the accompanying drawings in which:

FIGURE 1 is an exploded perspective view of the tensioner,

FIGURE 2 is a diagrammatic development of the circumference of a part of the tensioner, FIGURE 3 illustrates to a larger scale a fragment of the part shown in FIGURE 2, and FIGURE 4 is a sectional view of the tensioner in locked position.

The tensioner 11 of this example is for tensioning a roller chain in a chain drive in a similar manner to that described in United States patent specification No. 2,703,019. A rubberised head 12 is urged by spring 13 into contact with the chain plate edges and, as the chain wears, the head 12 is moved under the action of the spring 13 to take up slack in the chain.

The spring 13 is contained within a hollow cylinder 14 and acts between the head 12 and cylinder end-piece 15 fitted in one end of the cylinder 14. In this example the cylinder end-piece 15 is press fitted into the cylinder 14 and then brazed.

The cylinder 14 is received in a bore 16 of a cylindrical plunger 17 extending from the head 12 and the plunger 17 slides in a bore 18 in a supporting block 19 which thus houses the plunger 17. The bore 18 is closed at one end and the cylinder 14 abuts against the closed end 21 so that the spring 13 tends to move the head 12 away from the block 19.

The cylinder 14 is formed with a helical slot 22 into which projects a pin 23 which is fixed on the inside of the bore 16 to the plunger 17. One wall 24 of the helical slot 22 is serrated.

In operation, as the chain slackens the pin 23 slides on the region 25 of the opposite wall 26 of the helical slot 22. The cylinder 14 is thus caused to rotate as the plunger 17 and cylinder 14 move apart under the action of the spring 13. If the plunger 17 is pressed back into the bore 18, for example by vibration of the chain, the pin 23 is moved towards the wall 24 and engages in one of the hollows 27 between the serrations. Once the pin 23 has so engaged a hollow 27 further movement together of the cylinder 14 and the plunger 17 is prevented.

Thus the head 12 of the tensioner 11 takes up slack in the chain but only limited return movement of the head 12 is permitted. The amount of return movement is limited by the width of the helical slot 22 and this is selected to allow for likely tightening of the chain which may occur as a result of, for example, temperature changes.

To facilitate fitting the tensioner 11 in position so that the head 12 bears against a roller chain, it is necessary to have the cylinder 14 and plunger 17 locked together with the spring 13 compressed between them and the cylinder 14 projecting a short distance, as shown in FIGURE 4, beyond the open end of the bore 16. When the tensioner has been fitted it is necessary to release the cylinder 14 from the plunger 17 so that the spring 13 urges the head 12 against the roller chain.

For this purpose there is provided a step 28 in the wall 26 of the helical slot 22 near the end of the cylinder 14 remote from the head 12. To lock the cylinder 14 and plunger 17 together, the cylinder 14 is pressed against the bias of spring 13, and rotated until the pin 23 engages, on slight release of the pressure, in the step 28. This position is illustrated in FIGURES 2 and 4. The step 28 prevents sliding movement of the pin 23 along the wall 26 under the action of the spring 13 and thus locks the cylinder 14 and plunger 17 together.

On the wall 24 there is near to the step 28 a hollow 29 in the serrations which hollow 29 is displaced from a line through the step 28 parallel to the axis of the cylinder 14. The wall 24a on the side of the hollow 29 nearest to the step 28 forms an inclined face leading into the hollow 29. If, when in the locked position, the cylinder 14 and the plunger 17 are pressed together the pin 23 moves on the line A (FIGURE 3) into abutment with the wall 24a and, on further pressure, slides along the wall 24a so that the cylinder 14 and plunger 17 are caused to rotate relatively until the pin 23 moves into the hollow 29 in the position 23a shown dotted in FIGURE 3. On subsequent release of the cylinder 14 and plunger 17 the pin 23 moves under the action of the spring 13 on the line C into abutment with the region 25 of the wall 26. The pin 23 thus does not re-engage the step 28 and the cylinder 14 and plunger 17 are released so that the spring 13 is able to urge the head 12 against the roller chain.

As illustrated in FIGURE 4 the tensioner is prepared for fitting with the cylinder 14 and plunger 17 in the locked position, i.e. with the pin 23 engaging the step 28. To release the plunger and cylinder it is thus only necessary to press the head 12 towards the supporting block 19, and then release the head 12. As the head 12 is pressed the cylinder 14 abuts against the end 21 of the block 19 so that the cylinder 14 and plunger 17 are released as described above.

To prevent accidental release of the cylinder 14 and plunger 17 before the tensioner has been fitted a cardboard strip 31 (see FIGURE 4) is inserted between the head 12 and the block 19. The cardboard strip 31 is removed just before it is desired to release the cylinder 14 and plunger 17.

A lubricating oil feed inlet 32 in the block 19 leads oil to the sliding parts. A bore 33 through the head 12 allows oil to seep from inside the block 19 onto the head 12 and the chain.

The invention is not restricted to the details of the foregoing example.

I claim:

1. A tensioner for flexible power transmission members, which tensioner comprises two co-axial members relatively movable axially and rotatably about their axis, a helical slot on one member, the said helical slot having opposed side walls, one side wall comprising a smooth wall and the other side wall being provided with an inclined face, a projecting part on the other member, the projecting part extending into the helical slot, biassing means acting between the members to bias together the projecting part and the said smooth wall, whereby the members tend to undergo relative rotational and axial movement and the said projecting part tends to move along the smooth wall from one end thereof towards the other, a recess in the said one end of the smooth wall, whereby when the said projecting part engages in the recess the aforesaid movement under the action of the biassing means is prevented, the said projecting part being disengageable from the recess by relative axial movement of the members against the action of the biassing means, the said inclined face being positioned opposite the recess so that when the members are moved relatively axially to disengage the said projecting part from the recess and to move the said projecting part in sliding abutment over the inclined face, the movement of the said projecting part in sliding abutment over the inclined face causes relative rotation of the members whereby re-engagement of the said projecting part with the recess when the members are released is avoided and the members are freed for relative movement under the action of the biassing means as aforesaid.

2. A tensioner as claimed in claim 1, in which the said other side wall opposite the smooth wall of the helical slot provides a surface engageable by the said projecting part, which surface is formed so that when engaged by the projecting part the surface resists, more than the said smooth wall, sliding movement along it of the said projecting part.

3. A tensioner as claimed in claim 2, in which the said other side wall is serrated.

4. A tensioner as claimed in claim 1, in which the biassing means comprises a compression spring, each of the members is provided with a bore and the compression spring acts between the ends of the bores in the two members.

5. A tensioner as claimed in claim 1, in which the members comprise respectively a hollow cylinder, and a hollow cylindrical plunger, the hollow cylinder which has on it the helical slot being received within the hollow cylindrical plunger.

6. A tensioner as claimed in claim 5, in whch the plunger is received within a housing which is adapted to provide a stationary axial abutment for the hollow cylinder.

References Cited by the Examiner

UNITED STATES PATENTS

| | | | |
|---|---|---|---|
| 1,673,762 | 6/1928 | Chapman | 74—242.11 |
| 1,783,987 | 12/1930 | Thompson | 74—242.11 |
| 1,806,901 | 5/1931 | Hawley | 74—242.11 |
| 2,703,019 | 3/1955 | Burawoy | 74—242.11 |

DAVID J. WILLIAMOWSKY, *Primary Examiner.*

DON A. WAITE, *Examiner.*

J. A. WONG, *Assistant Examiner.*